(12) United States Patent
French

(10) Patent No.: US 6,654,794 B1
(45) Date of Patent: Nov. 25, 2003

(54) METHOD, DATA PROCESSING SYSTEM AND PROGRAM PRODUCT THAT PROVIDE AN INTERNET-COMPATIBLE NETWORK FILE SYSTEM DRIVER

(75) Inventor: Steven Michael French, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/538,994

(22) Filed: Mar. 30, 2000

(51) Int. Cl.[7] .............................................. G06F 15/16
(52) U.S. Cl. ....................................... 709/217; 709/219
(58) Field of Search ................................ 709/219, 203, 709/217; 707/226, 200, 10, 1

(56) References Cited

U.S. PATENT DOCUMENTS

| | | | |
|---|---|---|---|
| 5,754,774 A | | 5/1998 | Bittinger et al. |
| 5,935,212 A | | 8/1999 | Kalajan et al. |
| 5,964,886 A | * | 10/1999 | Slaughter et al. ............... 714/4 |
| 5,978,815 A | * | 11/1999 | Cabrera et al. .............. 707/204 |
| 6,016,496 A | | 1/2000 | Roberson |
| 6,061,504 A | * | 5/2000 | Tzelnic et al. ............... 709/219 |
| 6,144,999 A | * | 11/2000 | Khalidi et al. ............... 709/219 |
| 6,195,622 B1 | | 2/2001 | Altschuler et al. |
| 6,356,863 B1 | * | 3/2002 | Sayle ........................... 703/27 |
| 6,381,615 B2 | * | 4/2002 | Gaither et al. ............... 707/200 |
| 6,519,626 B1 | * | 2/2003 | Soderberg et al. ........... 709/203 |

OTHER PUBLICATIONS

Spring, Michael, Jan.–1997, "Software to Aid Collaboration: Focus on Collaborative Authoring", –Selected Groupware Tools, Programs, and Systems, http://www.sis.pitt.edu/~ spring/cas/node17.html.*

Taylor, "Evolutionary Design of Complex Systems", Sep. 1997, vol. 1, pp. 1–14.

Taylor, "Evolutionary Design of Complex Systems", Sep. 1997, vol. 2, pp. 1–13.

* cited by examiner

*Primary Examiner*—Ario Etienne
*Assistant Examiner*—Abdullahi E. Salad
(74) *Attorney, Agent, or Firm*—Marilyn Smith Dawkins; Bracewell & Patterson, L.L.P.

(57) ABSTRACT

A method, data processing system and program product are described that permit a client system to access a remote resource at a server coupled to the client system by a data network. In accordance with the present invention, an operating system receives, from a client application, a file system access request. In addition to identifying a remote resource, the file system access request specifies a file system operation on the resource in a format different than a HyperText Transfer Protocol (HTTP)-compatible format utilized by the server. In response to receipt of the file system access request by the operating system, the operating system routes the file system access request to a file system driver. The file system driver then translates the file system access request into the HTTP-compatible format employed by the server and constructs one or more request frames specifying the file system access request in the HTTP-compatible format. The request frames are then output by the client system on the data network to access the resource.

30 Claims, 4 Drawing Sheets

METHOD, DATA PROCESSING SYSTEM AND PROGRAM PRODUCT THAT PROVIDE AN INTERNET-COMPATIBLE NETWORK FILE SYSTEM DRIVER

CROSS-REFERENCE TO RELATED APPLICATION

The present application is related to U.S. application Ser. No. 09/539,423, which is filed on even date herewith and incorporated herein by reference.

BACKGROUND OF THE INVENTION

1. Technical Field

The present invention relates in general to data processing and, in particular, to the file systems implemented by various data processing systems. Still more particularly, the present invention relates to a network file system protocol and a network file system driver through which a client data processing system access a resource of a remote file system.

2. Description of the Related Art

An enterprise computing environment, for example, the network of a large corporation, typically contains a number of heterogeneous computer systems, operating systems, file systems, protocols and network architectures that cooperate to allow enterprise hardware and software resources to be shared by multiple computer systems. This type of computing environment is also referred to (for obvious reasons) as a heterogeneous distributed computing environment (HDCE).

In current HDCEs, each data storage device implements a particular file system, meaning that for different types of storage devices and for storage devices managed by diverse file server platforms, many different (and possibly incompatible) file systems are present in the HDCE. Accordingly, for a client system in the HDCE to obtain access to a particular resource (e.g., file), the client must format a request for the desired resource in an appropriate format for the file server managing the desired resource. Generally speaking, the client system formats access requests through one of a number of file system drivers, which each correspond to a respective file system. Thus, if an HDCE includes three file servers that each implement a respective one of the NetWare Core Protocol (NCP) of Novell, Inc., Orem, Utah, the Common Internet File System (CIFS) developed by Microsoft Corporation of Redmond, Wash., and the UNIX-based Network File System (NFS) developed by Sun Microsystems, the client system must have a separate file system driver for each file system, as well as a kernel file system router that determines which file system driver to utilize for each resource request. These different file system drivers are necessary because each file system protocol generally has different commands utilized to open, read, write, and close files, perform directory searches, obtain locks on shared files, etc.

Given the explosive growth of the Internet and its powerful resource sharing capabilities, it is now typical for many file servers, which are coupled to both the Internet and to a local network, to run both HyperText Transfer Protocol (HTTP) server software to service requests received from the Internet, and NFS, CIFS, or NCP server software to service requests received from a local network. The present invention recognizes that the implementation of two distinct resource access paths—one for local network resources and one for Internet resources—and the concomitant use of separate server software on the file server is a source of performance and administrative inefficiency.

SUMMARY OF THE INVENTION

The present invention overcomes the foregoing and other shortcomings in the art by providing a client with an improved network file system driver for accessing a remote resource maintained by a server in communication with the client via a data network.

In accordance with the present invention, an operating system receives, from a client application, a file system access request. In addition to identifying a remote resource, the file system access request specifies a file system operation on the resource in a format different than a HyperText Transfer Protocol (HTTP)-compatible format utilized by the server. In response to receipt of the file system access request by the operating system, the operating system routes the file system access request to a file system driver. The file system driver then translates the file system access request into the HTTP-compatible format employed by the server and constructs one or more request frames specifying the file system access request in the HTTP-compatible format. The request frames are then output by the client system on the data network to access the resource.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
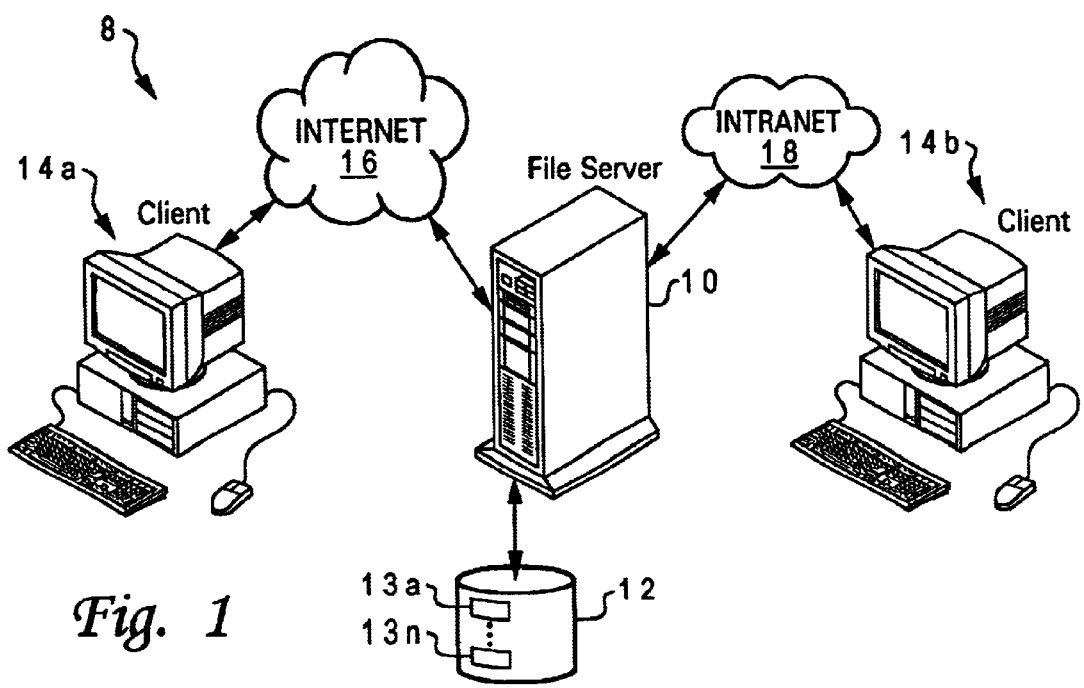
FIG. 1 depicts an illustrative embodiment of a network environment in which the present invention may advantageously be utilized.

With reference now to the figures and in particular with reference to FIG. 1, there is depicted an illustrative embodiment of a network environment in which the present invention may advantageously be utilized. As shown, network environment 8 includes a file server system 10 having an associated data storage device 12 that stores a plurality of resources 13a–13n (e.g., data files, executable files, scripts, etc.) that are available for access by client systems, such as clients 14a and 14b. File server system 10 may be implemented, for example, with one of the AS/400, RS/6000, Netfinity, or S/390 servers, which are all available from International Business Machines (IBM) Corporation of Armonk, N.Y.

Client 14a, which may be implemented as a conventional desktop computer system (as shown) or alternatively as any other type of data processing system, is coupled to file server system 10 via the Internet 16, which, as well known in the art, is a worldwide collection of networks and gateways that employ the Transmission Control Protocol/Internet Protocol (TCP/IP) suite of protocols to communicate data between clients and servers despite the presence of diverse underlying hardware platforms. According to the seven layer Open Systems Interconnection (OSI) protocol Reference Model proposed by the International Organization for Standardization (ISO), the IP and TCP protocols form the network and transport protocol layers, respectively, of Internet communication, and any of a number of other protocols may be layered on top of TCP/IP to provide the session, presentation, and application protocol layers. In accordance with the present invention, these additional layers of protocols preferably include the well-known HTTP and its extensions, such as Web Distributed Authoring and Versioning (WebDAV). WebDAV is defined by Internet Engineering Task Force (IETF) RFC 2518, which is incorporated herein by reference.

In contrast to client 14a, client 14b, which may also be implemented as a desktop computer system or any other type of data processing system, is coupled to file server system 10 by a Local Area Network (LAN), for example, intranet 18. Intranet 18 may support communication protocols other than the TCP/IP suite of protocols employed by Internet 16.

Figure 2:
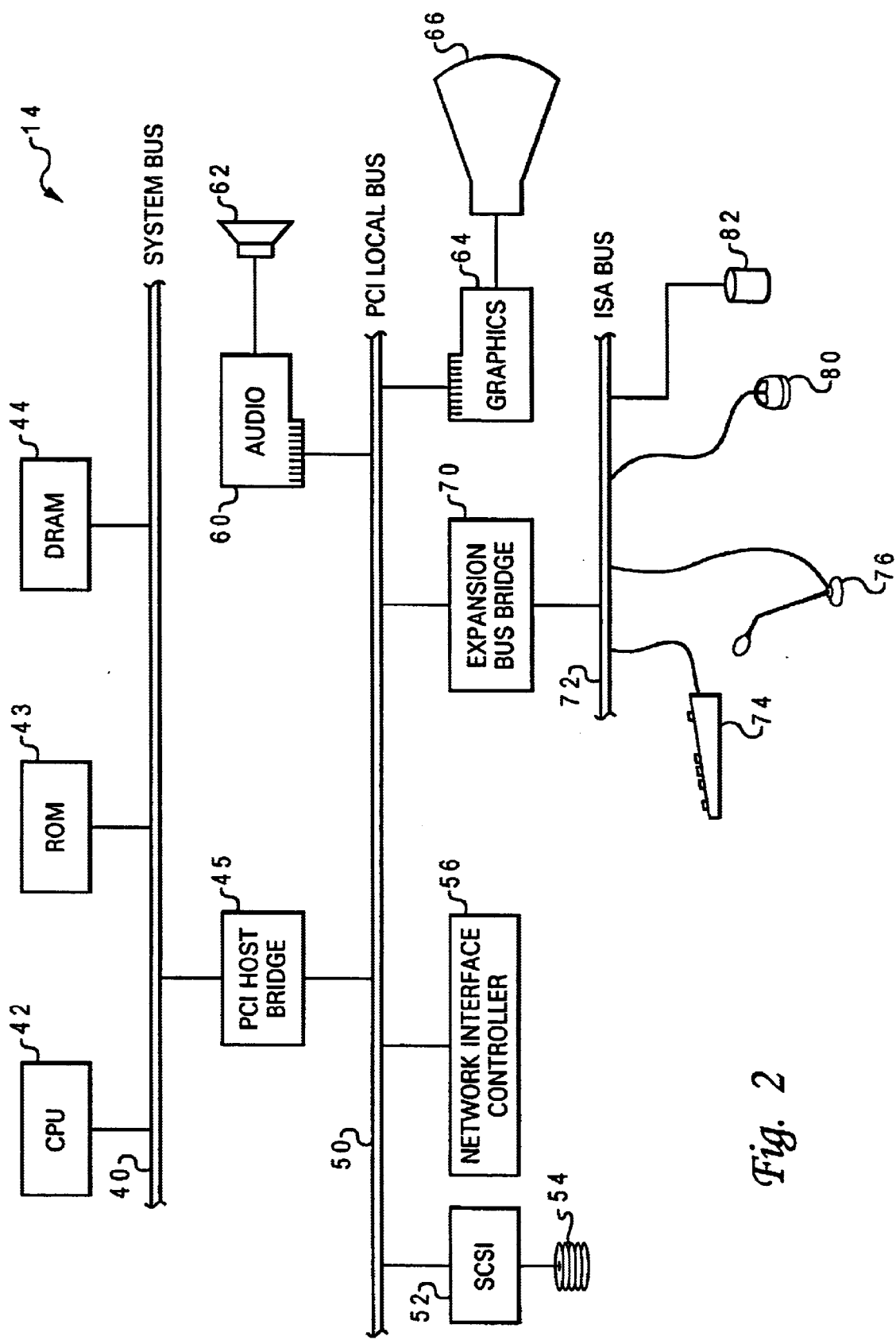
FIG. 2 illustrates a high level block diagram of an exemplary embodiment of a data processing system that may be employed as a client system in the network environment shown in FIG. 1.

Referring now to FIG. 2, there is depicted an exemplary desktop computer system embodiment of a client 14 from FIG. 1. As shown, client 14 has a system bus 40 connected to a central processing unit (CPU) 42, which executes software instructions and controls the operation of client 14, and read-only memory (ROM) 43 and dynamic random access memory (DRAM) 44, which provide storage for data and instructions that may be accessed by CPU 42. System bus 40 is coupled to PCI local bus 50 via Peripheral Component Interconnect (PCI) host bridge 45. PCI host bridge 45 provides both a low latency path through which CPU 42 may directly access PCI devices mapped to bus memory and/or I/O address spaces and a high bandwidth path through which PCI devices may directly access DRAM 44.

The PCI devices connected to PCI local bus 50 include Small Computer System Interface (SCSI) controller 52, which provides connections for multiple peripherals such as high speed SCSI disk drive 54, and Network Interface Controller (NIC) 56, which handles network communication between client 14 and intranet 18. For connection to Internet 16, NIC 56 may be replaced by a modem. In order to present audio and video data to a user, client 14 is further equipped with a PCI-compatible audio controller 60 and graphics controller 64, which drive stereo speakers 62 and video display 66, respectively. PCI bus 50 is further coupled to an expansion bus, such as ISA bus 72, via expansion bus bridge 70. Coupled to ISA bus 72 are a number of conventional input devices, such as keyboard 74, microphone 76 and mouse 80, as well as other peripherals, such as IDE hard disk 82.

Figure 3A:
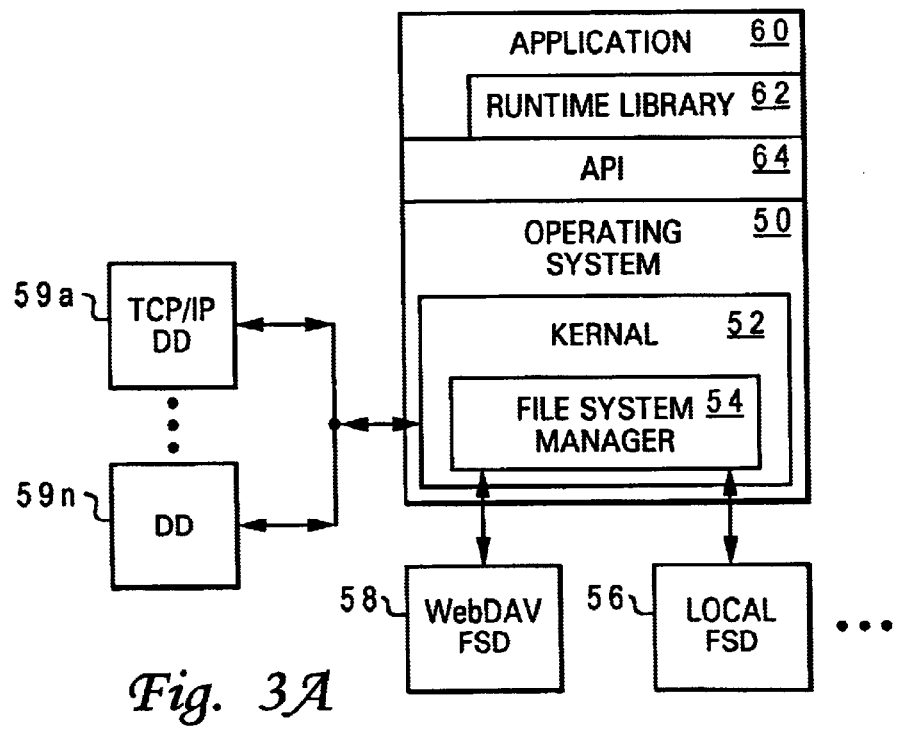
FIG. 3a is a layer diagram illustrating an exemplary software configuration of a client system in accordance with the present invention.

With reference now to FIG. 3A, there is illustrated a layer diagram of an exemplary software configuration of a client 14. As will be appreciated by those skilled in the art, the software executed by client 14 typically resides in non-volatile data storage either in client 14 (e.g., SCSI disk drive 54 or IDE hard disk 82) or at a server (e.g., in data storage device 12 of file server system 10) and is loaded into volatile memory (e.g., DRAM 44) in client 14 for execution by CPU 42.

As illustrated, the exemplary software configuration of FIG. 3A includes an operating system 50 (e.g., the OS/2 operating system developed by IBM Corporation or one of the Windows™ 95, 98 or NT operating systems developed by Microsoft Corporation) that controls the allocation and usage of the software and hardware resources of client 14. Operating system 50 includes a kernel 52, which is the core of operating system 50 that interacts most directly with system hardware. For example, kernel 52 implements system services, controls network access, implements one or more file systems within non-volatile storage, and schedules and dispatches tasks for execution on CPU 42.

Kernel 52 preferably provides a pluggable interface that can accept the installation of file system drivers (FSDs) (also known as installable file systems), as required. Each FSD provides for a particular file system a set of functions, including formatting data on the physical storage media, the ability to create, modify and delete resources (e.g., files), the ability to share and transfer resources securely, and the ability to access resources by logical naming conventions rather than physical location. Thus, in order to support access to multiple local and remote file systems, kernel 52 may have installed a respective local file system driver 56 for each file system (e.g., File Allocation Table (FAT) or High Performance File System (HPFS)) implemented in the non-volatile storage devices of client 14 and a respective network file system driver (also called a redirector) for each remote file system to which client 14 requests access. Kernel 52 manages these multiple installed FSDs through a file system manager 52 (or file system request router) that routes file system requests to the appropriate installed FSD and in such requests identifies, among other parameters, which of the possibly multiple resources implementing that file system are the subject of the file system request.

In accordance with the present invention, the network file system drivers installed in client 14 include WebDAV file system driver 58, which as described below in greater detail, extends the WebDAV standard referenced above to support a wide range of network file system entry points and functionality. With respect to the OSI Reference Model discussed above, WebDAV FSD 58 occupies the application and presentation protocol layers and interfaces at its lower boundary with the session layer. WebDAV FSD 58 translates file system access requests into appropriate WebDAV protocol frames (e.g., GET or PUT) and then packages the translated file system access request in one or more packets for transmission over Internet 16 or intranet 18. File system manager 54 is called by WebDAV FSD 58 to assist in this task by parsing resource names as well as by setting up and tearing down connections.

As further shown in FIG. 3A, kernel 52 also has a number of associated device drivers (DDs) 59a–59n that kernel 52 utilizes to manage physical input/output (I/O) with hardware devices. In addition to the standard array of audio, display, and printer device drivers common in desktop computer systems, client 14 includes a TCP/IP DD 59a that is called by kernel 52 to establish and manage communication with file server system 10.

The software configuration of client 14 further includes a client application 60, which may comprise, for example, a word processing or database program. To perform its various operations and to provide the requisite functionality of its features, client application 60 requests various services from operating system 50. These requests, which may initially call a pre-stored routine in an operating system runtime library 62, are passed to operating system 50 via an Application Programming Interface (API) 64. If the request is a file system access request (e.g., OPEN, READ, WRITE, CLOSE, DIRECTORY SEARCH, etc.), the request is handled by file system manager 54, which routes the request to the appropriate FSD. Importantly, according to the present invention, application 60 need not be compatible with or capable of processing HTTP (as browsers and a limited number of web page authoring and other applications are) in order access remote resources via an HTTP-compatible protocol such as Web DAV. Instead, WebDAV FSD 58 translates and packages file system access requests into WebDAV frames that can be directly understood by HTTP-compliant server software.

Figure 3B:
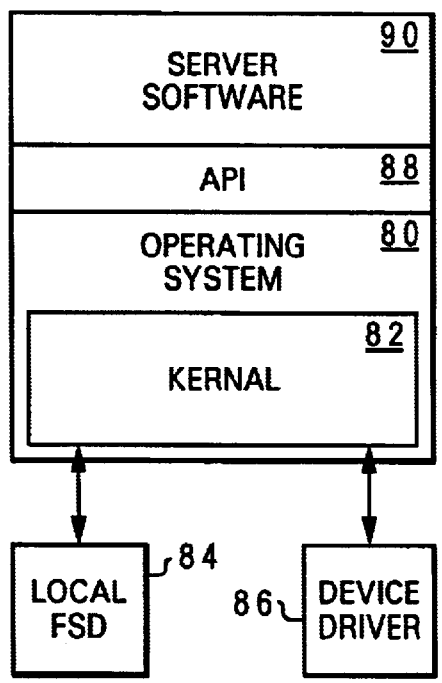
FIG. 3b is a layer diagram depicting an exemplary software configuration of a file server system in accordance with the present invention.

Referring now to FIG. 3B, there is depicted a layer diagram of an exemplary software configuration of file server system 10 from FIG. 1. As shown, file server system 10 includes an operating system 80 (including a kernel 82), one or more local FSDs 84 for implementing the file system(s) of data storage device 12, one or more device drivers 88, and an API 88. Operating system 80 of server 10 can be the same as or different from client operating system 50. In addition, in order to service requests by both client 14a and 14b (i.e., local network and external network clients) for resources 13a–13n in data storage device 12, file server system 10 runs server software 90 on top of operating system 80. In contrast to prior art network environments, which typically require separate server software for local network and external network (e.g., Internet and intranet) clients, server software 90 is preferably a single server such as the shareware Apache HTTP server available from the Apache Software Foundation. Server software 90 responds to WebDAV packets containing file system access requests by routing those requests via API 88 to kernel 82, which in turn routes the file system access request to the appropriate local FSD 84 for the target resource.

Figure 4:
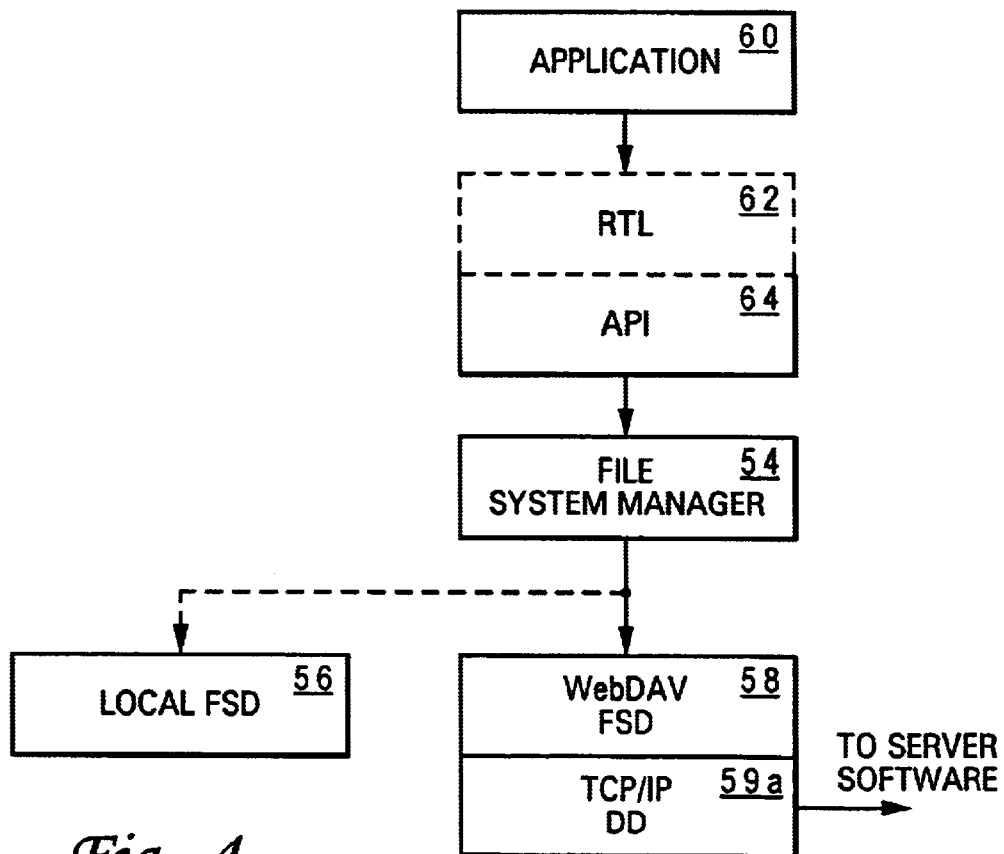
FIG. 4 is a flow diagram illustrating the handling of a client's file system access request in the network environment of FIG. 1 in accordance with the present invention.

With reference now to FIG. 4, there is illustrated a data flow diagram showing the handling of a file system access request in accordance with the present invention. As shown, an application 60 running on either of clients 14a and 14b (hereafter, the requester will be assumed to be application 60 of client 14b) makes a file system access request to operating system 50. Depending upon operating system 50 and application 60, the file system access request may be made either through a command line interface (CLI) or a graphical interface. Thus, for example, a user may specify a CLI command that directly invokes an system API, or alternatively, may utilize a graphical interface provided by a dynamic-link library (DLL), such as the LAN Aware Workplace Shell (LAWPS) DLL for OS/2 or a Network Provider DLL that plugs into the Multiple Provider Router (MPR) interface of Windows 95, 98 and NT.

The file system access request can also specify the target resource(s) in one of at least two ways. First, as popularized by the DOS operating system and now utilized by OS/2, Windows 95, 98 and NT, the resource can be identified by a path that begins with a logical drive designation. In this case, the logical drive designation (e.g., "X:" or "Y:") must first be associated with the collection including the resource by "mounting" (also known as attaching or connecting) the logical drive. To accomplish this, the present invention assumes the presence of utilities to mount and unmount logical drives, which are referred to herein as WebDAV-Mount and WebDAVUnMount, respectively. Such utilities call the appropriate API, such as the DosFSAttach API for OS/2, which attaches and detaches logical drives. While current operating systems only permit alphabetic designations of logical drives, the present invention contemplates that future operating systems may permit any string (e.g., "http:" or "WebDAV:") to be mounted as a logical drive. It would be advantageous for operating system 50 to provide support for non-alphabetic drive designations to eliminate the need to map between logical drive path designations and network path designations.

Second, the file system access request may alternatively specify the target resource via a path, for example, according to the Uniform Naming Convention (UNC) format \\servername\sharename\path . . . \resourcename. Of course, since a UNC designation does not reference any logical drive designation, a file system access request containing a UNC path of a target resource need not be preceded by a mount or unmount command.

Referring again to FIG. 4, depending upon operating system 50 and application 60, in making the request application 60 may call a routine in runtime library (RTL) 62 or may pass the file system access request directly to API 64. The file system access request is then handled by file system manager 54 of kernel 52, which routes the file system access request to the appropriate file system driver (FSD) for the resource specified in the file system access request. Thus, if the target resource is local to client 14b, file system manager 54 routes the request to local FSD 56. However, if the requested resource is one of resources 13a–13n in data storage device 12 of file server 10, file system manager 54 routes the request to WebDAV FSD 58 for processing.

The routing performed by file system manager 54 can be implemented in a number of ways. For example, if the file system access request includes a UNC path for the resource, file system manager 54 can parse the syntax of the path name to select an appropriate FSD. Alternatively, file system manager 54 may implement a resource table that maps requested resources with certain file systems and therefore certain FSDs.

In order to be accepted for processing by operating system 50, the file system access request must be appropriately formatted as one of the file system entry points supported by operating system 50. As will be appreciated by those skilled in the art, for current operating systems such file system entry points are not HTTP-compatible. Accordingly, as described further below, WebDAV FSD 58 translates the file system operation specified in the file system access request into zero or more WebDAV protocol frames, as described in greater detail below with respect to Tables I and II.

In addition, WebDAV FSD 58 converts the resource field of the file system access request into the appropriate format. The conversion of the resource field can be performed, for example, by reference to one or more tables or by directly parsing and converting the specified (e.g., UNC) path name.

Figure 5:
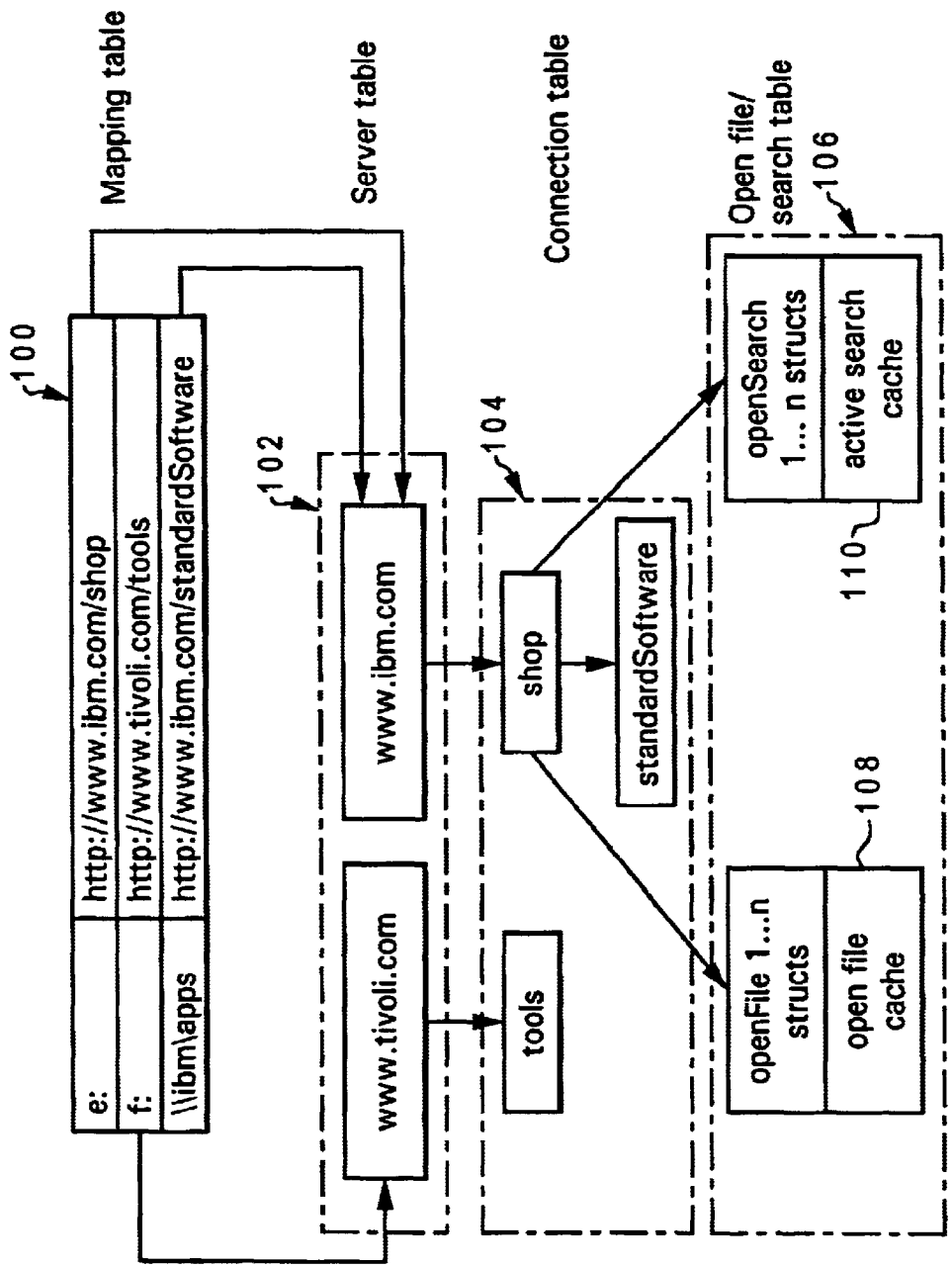
FIG. 5 depicts a number of data structures utilized by a WebDAV file system driver to translate file system access requests to WebDAV protocol frames in accordance with the present invention.

With reference now to FIG. 5, there are depicted block diagram representations of tables that may be utilized by WebDAV FSD 58 to convert resource fields into the appropriate format in accordance with a preferred embodiment of the present invention. As shown, the tables include a mapping table 100 that associates logical drives (e.g., "e:" and "f:") and UNC path designations (e.g., "\\ibm\apps") associated with remote resources by operating system 50 with the full HTTP paths of the remote resources. The logical drive entries in mapping table 100 are entered and removed by the WebDAVMount and WebDAVUnMount utilities described above. Table entries associating a UNC path with an HTTP path are entered upon a determination that the specified collection exists, as discussed below.

The data structures employed by WebDAV FSD 58 further include a server table 102 listing the host names necessary to establish communication to host machines corresponding to paths listed in mapping table 100, a mounting point table 104 listing the unique connections of client system 14 to resources or remote servers, and finally an open file/search table 106 listing the open files and open searches of client system 14. The open file/search table 106 also preferably includes an open file cache 108 for caching read-ahead and write-behind data and an active search cache 110 for caching data pertaining to open searches.

As noted above, WebDAV FSD 58 may also directly parse and convert a UNC path name specified in a file system access request to an HTTP path, if a mapping for the conversion is not already present in mapping table 100. In particular, WebDAV FSD 58 translates UNC paths beginning with "\\". (e.g., "\\server_name\sharename\path" to "http://host_name/sharename/path", where server_name is assumed to be a TCP host name or IP address and the sharename is considered to be the first path component. (It is important to note that the direction of the slashes are reversed due to the difference in PC and network conventions.)

Following translation of the file system operation and conversion of the resource designation, WebDAV FSD 58 packages the resulting WebDAV protocol frame(s), if any, into one or more WebDAV packets. Kernel 52 then calls TCP/IP DD 59a to manage communication of the WebDAV packets to server software 90 running on file server system 10 via intranet 18. The file service access request is then serviced in a conventional manner by server software 90.

If server software 90 determines that the requested resource does not exist, meaning that the resource field conversion may be incorrect, WebDAV FSD 58 can attempt alternate conversions, e.g., prepending "www" to server_name. For example, a request to DosOpen the UNC path \\ibm.com\support\myfile.txt would initially be translated into a WebDAV PROPFIND and GET on the resource http:\\ibm.com/support/myfile.txt. If that resource is not found, then WebDAV FSD 58 may then attempt access to http:\\www.ibm.com/support/myfile.txt before returning ERROR_PATH_NOT_FOUND or equivalent. As usual, the host name (server name) in a file system access request need not be fully qualified since "servername" and "servername.austin.ibm.com" are equivalent for client computer systems in the austin.ibm.com TCP domain (but not for client computer systems in other domains).

As noted above, a number of diverse operating systems may be utilized as operating system 50 of clients 14. Each of these diverse operating systems generally has its own respective set of supported file system entry points. Table I, below, lists a number of OS/2 file system entry points that are preferably supported by WebDAV FSD 58 in accordance with the present invention. Table I further provides a brief description of each file system entry point along with the WebDAV frames utilized to implement each file system entry point.

TABLE I

| FS Entry Point | Description | WebDAV frame |
| --- | --- | --- |
| FS_ATTACH | Attach to an FSD | If matching WebDAV collection is verified to exist, create entry in the local FSD's connection table which will map requests for local path (e.g. Z: or Y:) to remote path. Issue WebDAV PROPFIND request with depth zero on resource matching requested remote path. Requests to mount standard UNC paths (conventionally of the form \\server\share\path) would be converted to the form "http://server/share/path)" |
| | Detach an FSD | Remove resource from (local file system driver's connection table) No frame sent |
| FS_CANCEL LOCKREQUEST | Cancel file record lock request | Ignore the request and let the lock timeout on the server |
| FS_CHDIR | Change/ verify directory path | Two approaches: a) can be ignored (allowing compatibility with older HTTP 1.1, which permits sparse path hierarchies; or b) preferably do PROPFIND on target path |
| FS_CHGFILEPTR | Move a file's position pointer | Two approaches: a) for optimum performance this can be ignored if file size returned on FS_OPENCREATE (which was originally returned via PROPFIND on live property "getContentLength") was greater than requested offset (i.e., seek location); or b) issue PROPFIND on live property "getContentLength" to verify that file size is larger than requested offset (i.e., seek location) |
| FS_CLOSE | Release a file handle | Issue PUT request to write out any cached (write behind) data, if any. Delete the client FSD's cached data for this file and delete internal file handle structure |
| FS_COMMIT | Flush a file's buffer to disk | If write behind caching is enabled in our FSD, issue PUT request to write all cached (modified on client but not yet sent to the server) data for this file |
| FS_COPY | Copy a file | COPY |
| FS_DELETE | Delete a file | DELETE |

TABLE I-continued

| FS Entry Point | Description | WebDAV frame |
| --- | --- | --- |
| FS_EXIT | End of a process cleanup | none |
| FS_FILEATTRIBUTE | Query/Set file's attributes | QueryFileAttribute causes PROPFIND of client specific "fileAttribute" property. SetFileAttribute causes PROPPATCH of "fileAttribute" |
| FS_FILEINFO | Query/Set file's information | SetFileInfo causes PROPPATCH QueryFileInfo causes PROPFIND. Date/Time stamps are handled via PROPFIND of creationDate and getLastModified properties. Extended Attributes are handled via a PROPFIND or PROPPATCH (for Query and Set, respectively). Note that the similar concept in other operating systems of alternate "file streams", such as in Windows NT and data forks in the Mac OS may be implemented in an alternate way, without use of PROPFIND and PROPPATCH. Instead, these forks/streams can automatically be stored as distinct files with related file names such as "filename:streamname" and the relationship can be indicated by creating a property cross-referencing one another (that is used on deletion of the main file to clean up the associated data stream(s) or fork(s)). |
| FS_FILEIO | Multi-functional file I/O | Return "Not supported" error to the IFS router. For file system drives that do not support this performance optimization, the OS kernel will issue individual Read, Write, ChgFilePtr, Lock and/or Unlock requests. |
| FS_FILELOCKS | Request a file record lock/unlock | LOCK for a lock request UNLOCK for an unlock request |
| FS_FINDCLOSE | Directory search close | Release directory cache |
| FS_FINDFIRST | Find first matching filename | Create a "search ahead" cache for this directory by completely listing all entries in the corresponding WebDAV collection and storing them in memory |
| FS_FINDFROMNAME | Find matching filename from name | Search through the client's directory cache for the 1st matching entry and return search data (directory contents) beginning with that entry |
| FS_FINDNEXT | Find next matching filename | Continue returning contents for this directory (WebDAV) collection from the cache (created on the FS_FINDFIRST call) |
| FS_FINDNOTIFYCLOSE | Close FindNotify handle | Return "error not supported" |
| FS_FINDNOTIFYFIRST | Monitor a directory for changes | Return "error not supported" |
| FS_FINDNOTIFYNEXT | Resume reporting directory changes | Return "error not supported" |
| FS_FLUSHBUF | Commit file buffers to disk | As in FS_COMMIT but writes out (issues multiple PUT requests for write behind data, if any) one for each recently modified open file in this volume (i.e., PC drive, attached to our FSD by FS_ATTACH). |
| FS_FSCTL | File system control | For get maximum EA (extended attribute) size (func = 2) return maximum EA size of 64K-1 and maximum EA list size of 64K-1. |
| FS_FSINFO | Query/Set file system information | file size is returned via PROPFIND for the getContentLength property on the collection (the remote URI corresponding to the root directory of the local drive). Volume name is retrieved via PROPFIND. |
| FS_INIT | FSD initialization | Initialize file system, e.g. create empty mount list (attach list), file handle list, directory handle (search handle) list. Verify that TCP/IP support is available. No remote WebDAV frames issued. |
| FS_IOCTL | I/O device control | Not remote to WebDAV server, but may be used as a private interface between the FSD and a controlling program such as a debugging utility |
| FS_MKDIR | Make a directory | MKCOLL |
| FS_MOVE | Move a file or subdirectory | MOVE (with overwrite header not set to T, indicating that the server is not to overwrite an existing collection or file of the same name) |
| FS_NEWSIZE | Change a file's logical size | Two approaches: a) attempt to change the live server property getContentLength (via PROPPATCH request), if that fails; or b) pad the cached file data (that was retrieved from FS_OPENCREATE via a WebDAV GET request) (e.g. with a string of 0s) and issue a WebDAV PUT request |

TABLE I-continued

| FS Entry Point | Description | WebDAV frame |
| --- | --- | --- |
| FS_OPENCREATE | Open, create, or replace file | For Open, issue GET request. To improve performance, if the target file is larger than a predetermined threshold or if cache space is severely constrained a "partial GET" (i.e., a GET with a range request header as allowed in HTTP 1.1 (RFC 2068)) may be attempted. Cache file contents in memory (or on local disk if the remote file is large). Issue PROPFIND for creationDate and getLastModified (to obtain file date/time stamps). For Create, if "fail if file exists" flag - verify that file does not exist (via PROPFIND) else return error. Issue PUT request of empty file to server. Create (empty) cache for this file locally on the client in memory. If "deny write" or "deny all" flags are specified on the FS_OPENCREATE request, also issue WebDAV LOCK request for the file name |
| FS_PATHINFO | Query/Set a file's information | Date/Time stamps are handled via PROPFIND of creationDate and getLastModified properties. Extended Attributes will be manipulated via a PROPFIND or PROPPATCH WebDAV request (for Query and Set, respectively). Note that the similar concept in other operating systems of alternate "file streams" such as in Windows NT and data forks in Mac OS may be implemented an alternate way, without the use of PROPFIND and PROPPATCH. Instead, these forks/streams can automatically be stored as distinct files with related file names such as "filename:streamname" and the relationship can be indicated by creating a property cross-referencing one another (that is used on deletion of the main file to clean up the associated data stream(s) or fork(s)). |
| FS_READ | Read data from a file | Read cached data from read-ahead cache initialized when FS_OPENCREATE was invoked if file is locked of if server does not support range requests. Otherwise, do GET with range request header specified (i.e., a "partial" GET corresponding to the offset and length requested on the read) |
| FS_RMDIR | Remove a subdirectory | To ensure that the directory is empty before removal, enumerate contents of the directory (e.g. via the WebDAV GET request on the corresponding collection). If directory is not empty return ERROR_ACCESS_DENIED; otherwise issue the WebDAV request DELETE to delete the directory (collection). |
| FS_SHUTDOWN | Shutdown a file system | On pass one (type = 0, indicating shutdown is about to commence), disable write behind caching. On pass two (type = 1), write back any non-flushed write behind data by issuing PUT requests. |
| FS_VERIFY UNCNAME | Verify UNC server ownership | On pass one (flag = 0), do nothing (return "path not found" error). On pass two (flag = 1), determine if the corresponding remote resource (hostname/ servername and collection/sharename) exist by issuing PROPFIND, e.g., on R:"http://server_name/sharename" |
| FS_WRITE | Write data to a file | Operates on cached copy of file (PUT request will eventually be done in the background) |

It should be noted that WebDAV (and HTTP) are stateless (idempotent) protocols, which creates the potential for performance problems for PC and other operating systems that expect a stateful file system. Lack of shared client/server state in WebDAV (e.g., caching tokens or PC "opportunistic locks") means that caching (i.e., implementing standard "read-ahead" or "write-behind" techniques) is risky and can result in loss of data. A compromise between optimal performance (by allowing caching) and risk is achieved by writing modified files out at regular intervals utilizing a background thread (and flushing the write-behind cache). Similarly, read-ahead caching can be supported by implementing a separate thread to obtain data ahead of a current location. Implementing read-ahead and write-behind caching in the WebDAV file system is optional and can be controlled, for example, by a client system configuration switch in the system registry, config.sys file or equivalent.

Utilizing the translations between OS/2 file system entry points and WebDAV frames given in Table I, an example of a processing scenario in which WebDAV FSD 58 is implemented in a client system running OS/2 is now given. In the example it will be assumed that "WebDAVMount" is a utility program that invokes the operating system mount facility (via the system API DosFSAttach), an exemplary sequence of processing is as follows:

1) WebDAVMount X: http://www.ibm.com/shop
2) DIR x:\aptiva\currentModels
   ! causes FS_FINDFIRST,
   ! FS_FINDNEXT,
   ! FS_FINDCLOSE
   ! commands to be
   ! issued to FSD
3) Copy x:\aptiva\currentModels\modelS608.doc x:\aptiva\oldModels\
4) Open x:\aptiva\currentModels\modelS608.doc causes FS_OPENCREATE to be issued to FSD)
5) Write to file
6) Close file
7) Move x:\aptiva\currentModels\modelS608.doc x:\aptiva\currentModels\modelS609.doc
8) WebDavUnMount X:

This sequence of processing steps would result in the following WebDAV frames:
1) PROPFIND
2) GET (on the collection)
3) COPY
4) multiple PROPFIND frames, GET
5) none
6) PUT
7) MOVE
8) none Once the use of WebDAV to provide network file system support is understood, a WebDAV FSD can be developed for the calls of each operating system. Table II below summarizes Installable File System (IFS) API calls and corresponding file system entry points for the Windows™ 9x operating system.

TABLE II

| IFS Spec. API | FunctionNum | WebDAV frame |
|---|---|---|
| FS_ReadFile | IFSFN_READ (0) | Read cached data from read-ahead cache that was initialized when FS_OpenFile was invoked if file is locked or if server does not support range requests; else do GET with range request (corresponding to the offset and length requested on the read) header specified |
| FS_WriteFile | IFSFN_WRITE (1) | Write data to cached copy of file if caching is enabled (PUT request will eventually be done in the background) else do immediate PUT request (with modified data overlaid over a copy of the file data retrieved from previous GET request). |
| FS_FindNextFile | IFSFN_FINDNEXT (2) | Continue returning contents for this directory (WebDAV collection) from the cache (created on the FS_FindFirstFile call) into the applications buffer. |
| . . . | IFSFN_FCNNEXT (3) | N/A; requests to initiate change notification return; ERROR_NOT_SUPPORTED |
| FS_FileSeek | IFSFN_SEEK (10) | Two approaches: a) for optimum performance can be ignored if file size returned on FS_OpenFile (returned via PROPFIND on live property "getContentLength") was greater than requested offset (seek location); or b) issue PROPFIND for live property "getContentLength" to verify that seek is not past the end of the file In either case, an optional performance enhancement can be to do a "partial GET" request in the background - starting at the new offset, if the file contents were not completely cached by FS_OpenFile |
| FS_Close | IFSFN_CLOSE (11) | Issue PUT request to write any cached (write behind) data, if any. Delete the cache entries for this file (if any) and delete the internal per file structure (file handle struct). |
| FS_CommitFile | IFSFN_COMMIT (12) | If write behind caching is enabled in our FSD, issue PUT request to write out all modified cached (write behind) data for this file. |
| FS_LockFile | IFSFN_FILELOCKS (13) | LOCK or UNLOCK (depending on input flags) |
| FS_FileDateTime | IFSFN_FILETIMES (14) | DateTimeStamps are handled by issuing PROPFIND of creationDate and getLastModified properties of the file. Changing date and time stamps can be done (if the server allows it) by PROPPATCH on the two properties listed above. If that fails an alternate client specific property (not live server property) may be used. |

TABLE II-continued

| IFS Spec. API | FunctionNum | WebDAV frame |
|---|---|---|
| FS_NamedPipe Request | IFSFN_PIPEREQUEST (15) | not supported |
| FS_NetHandle Info | IFSFN_HANDLEINFO (16) | not remote (handled from internal data) |
| FS_Enumerate Handle | IFSFN_ENUMHANDLE (17) | not remote (handled from internal tables) |
| FS_FindClose | IFSFN_FINDCLOSE (18) | free "search ahead" directory cache |
| . . . | IFSFN_FCNCLOSE (19) | N/A - requests to initiate change notification returned ERROR_NOT_SUPPORTED |
| FS_MountVolume FS_ConnectNet Resource | IFSFN_CONNECT (30) | If matching WebDAV collection is verified to exist, create entry in the local FSD's connection table which will map requests for the specified local path (e.g. Z: or Y:) to the specified remote path (URL). |
| FS_DeleteFile | IFSFN_DELETE (31) | DELETE |
| FS_Dir | IFSFN_DIR (32) | MKCOLL (for make directory) or DELETE (for remove directory) |
| FS_FileAttributes | IFSFN_FILEATTRIB (33) | PROPFIND |
| FS_FlushVolume | IFSFN_FLUSH (34) | As in FS_CommitFile but writes out (potentially issues multiple PUT requests for write behind data, if any for each client modified file) one for each recently modified open file in this volume (i.e. PC drive, attached to our FSD) |
| FS_GetDiskInfo | IFSFN_GETDISKINFO (35) | volume size is returned via PROPFIND on root of the collection) in use space can be calculated recursively via multiple search requests followed by PROPFINDs. Volume name is retrieved via PROPFIND of client specific property (if present). |
| FS_OpenFile | IFSFN_OPEN (36) | A) for File "Open", issue request. To improve performance if the target file is larger than a predetermined threshold or if cache space is severely constrained a "partial GET" may be attempted (a GET with a range request header, e.g., requesting the first 4196 bytes rather than the whole file). For file "Create", if "fail if file exists" flag is set - verify that the file does not exist (via PROPFIND)) else return error. Then issue PUT request of empty file to server Create (empty) cache entry for this file locally on the client (in memory). If "deny write" or "deny all" flags are specified on the FS_OPENCREATE request, at end of open (or create) processing issue WebDAV LOCK request for the target file. |
| FS_RenameFile | IFSFN_RENAME (37) | MOVE |
| FS_SearchFile | IFSFN_SEARCH (38) | For 1st search on path see FS_FindFirstFile. For subsequent searches on same path - see FS_FindNextFile. Cached directory entries are timed out to free directory cache for this path |
| FS_QueryResource Info | IFSFN_QUERY (39) | PROPFIND |
| FS_Disconnect Resource | IFSFN_DISCONNECT (40) | Remove resource (from local file system driver's connection table) and free open file structures and active search structures and associated cache data. |
| FS_NamedPipe UNC Request | IFSFN_UNCPIPEREQ (41) | not supported |
| FS_Ioctl16Drive | IFSFN_IOCTL16DRIVE (42) | not applicable (can be used to control the FSD locally, e.g., start driver, stop driver, pause driver) |
| FS_GetDiskParms | IFSFN_GETDISKPARMS (43) | volume size is returned via PROPFIND on root of the collection) in use space can be calculated recursively via multiple search requests followed by PROPFINDS. |
| FS_FindFirst File | IFSFN_FINDOPEN (44) | Create a "search ahead" directory cache for this directory by completely listing all entries in the corresponding WebDAV collection and storing them in memory. |

TABLE II-continued

| IFS Spec. API | FunctionNum | WebDAV frame |
|---|---|---|
| FS_DirectDiskIO | IFSFN_DASDIO (45) | not supported |

As has been described, the present invention provides an improved client network file system driver (FSD) that facilitates access to remote resources accessible to the client over a network. In particular, a client network FSD in accordance with the present invention preferably translates file system entry points received from an operating system kernel into Internet standard method invocations and packages such method invocations into frames for transport over a network. In this manner applications that are not capable of processing or compatible with HTTP are able to easily access files and other resources remotely. Thus, the present invention provides a client application network transparency (i.e., the client application and user need not be aware of the network location or network technology to access a resource), location transparency, and location independence.

While the invention has been particularly shown and described with reference to a preferred embodiment, it will be understood by those skilled in the art that various changes in form and detail may be made therein without departing from the spirit and scope of the invention. For example, although aspects of the present invention have been described with respect to a computer system executing software that directs the functions of the present invention, it should be understood that present invention may alternatively be implemented as a program product for use with a data processing system. Programs defining the functions of the present invention can be delivered to a data processing system via a variety of signal-bearing media, which include, without limitation, non-rewritable storage media (e.g., CD-ROM), rewritable storage media (e.g., a floppy diskette or hard disk drive), and communication media, such as digital and analog networks. It should be understood, therefore, that such signal-bearing media, when carrying or encoding computer readable instructions that direct the functions of the present invention, represent alternative embodiments of the present invention.

What is claimed is:

1. A method for accessing a remote resource at a server from a client system coupled to said server by a data network, said method comprising:

receiving, from a client application at an operating system of a client system, a file system access request identifying a remote resource, wherein said file system access request specifies a file system operation on said resource in an format different than a HyperText Transfer Protocol (HTTP)-compatible format utilized by said server;

in response to receipt of said file system access request by said operating system, routing said file system access request to a file system driver in said client system;

utilizing said file system driver, translating said file system access request into said HTTP-compatible format and constructing one or more request frames specifying said file system access request in said HTTP-compatible format, said HTTP-compatible format employing a protocol layer above a transport layer; and outputting said one or more request frames from said client system on said data network to access said resource.

2. The method of claim 1, wherein said step of receiving a file system access request comprises receiving a read request, and wherein said step of constructing one or more request frames comprises constructing a request frame including a HyperText Transfer Protocol (HTTP)-compatible GET.

3. The method of claim 1, wherein said step of receiving a file system access request comprises receiving a write request, and wherein said step of constructing one or more request frames comprises constructing a request frame including a HyperText Transfer Protocol (HTTP)-compatible PUT.

4. The method of claim 1, wherein translating said file system access request into said HTTP-compatible format comprises translating said file system access request into WebDAV format.

5. The method of claim 1, wherein routing said file system access request comprises routing said file system access request based upon a path specified in said file system access request.

6. The method of claim 1, and further comprising managing communication with said data network utilizing a Transport Control Protocol/Internet Protocol (TCP/IP) device driver.

7. A client data processing system, comprising:

a processor and data storage coupled to said processor; and a client application and file system driver in said data storage and executable by said processor, wherein said file system driver, responsive to receipt, from said client application, of a file system access request identifying a remote resource, said file system access request specifying a file system operation on said resource in an format different than a HyperText Transfer Protocol (HTTP)-compatible format utilized by a server for said resource, translates said file system access request into said HTTP-compatible format and constructs one or more request frames specifying said file system access request in said HTTP-compatible format, said HTTP-compatible format employing a protocol layer above a transport layer, and wherein said client data processing system outputs said one or more request frames to obtain access to said resource for said client application.

8. The client data processing system of claim 7, wherein said file system access request is a read request, and wherein said one or more request frames comprise a request frame including a HyperText Transfer Protocol (HTTP)-compatible GET.

9. The client data processing system of claim 7, wherein said file system access request is a write request, and wherein said one or more request frames comprise a request frame including a HyperText Transfer Protocol (HTTP)-compatible PUT.

10. The client data processing system of claim 7, wherein said HTTP-compatible format comprises WebDAV format.

11. The client data processing system of claim 7, and further comprising a operating system that routes said file system access request to said file system driver based upon a path specified in said file system access request.

12. The client data processing system of claim 7, and further comprising a Transport Control Protocol/Internet Protocol (TCP/IP) device driver that manages communication on said data network.

13. A computer program product, comprising:

a computer usable medium; and a file system driver in said computer usable medium and executable by a data processing system, wherein said file system driver, responsive to receipt, from a client application, of a file system access request identifying a remote resource, said file system access request specifying a file system operation on said resource in an format different than a HyperText Transfer Protocol (HTTP)-compatible format utilized by a server for said resource, translates said file system access request into said HTTP-compatible format and constructs one or more request frames specifying said file system access request in said HTTP-compatible format, said HTTP-compatible format employing a protocol layer above a transport layer.

14. The computer program product of claim 13, wherein said file system access request is a read request, and wherein said one or more request frames comprise a request frame including a HyperText Transfer Protocol (HTTP)-compatible GET.

15. The computer program product of claim 13, wherein said file system access request is a write request, and wherein said one or more request frames comprise a request frame including a HyperText Transfer Protocol (HTTP)-compatible PUT.

16. The computer program product of claim 13, wherein said HTTP-compatible format comprises WebDAV format.

17. The computer program product of claim 13, and further comprising a operating system that routes said file system access request to said file system driver based upon a path specified in said file system access request.

18. The computer program product of claim 13, and further comprising a Transport Control Protocol/Internet Protocol (TCP/IP) device driver that manages communication on said data network.

19. The method of claim 1, where said step of constructing one or more request frames comprises constructing a plurality of request frames, wherein at least two of said plurality of request frames are different types of frames specifying different file access methods.

20. The method of claim 1, wherein said file system access request is a first file system access request, said method further comprising:

in response to receipt of a second file system access request, refraining from constructing any request frame and refraining from outputting any request frame on said data network.

21. The method of claim 1, said translating step comprising translating at least one of a logical drive and file system path name in said file system access request into a universal resource identifier.

22. The method of claim 21, said method further comprising constructing a mapping table including at least one entry mapping between a universal resource identifier and at least one of a logical drive and file system path name, wherein said translating step comprises translating by reference to said mapping table.

23. The client data processing system of claim 7, wherein, responsive to said file system access request, said file system driver constructs a plurality of request frames, wherein at least two of said plurality of request frames are different types of frames specifying different file access methods.

24. The client data processing system of claim 7, wherein said file system access request is a first file system access request, and wherein said file system driver, responsive to receipt of a second file system access request, refrains from constructing any request frame and refrains from outputting any request frame on said data network.

25. The client data processing system of claim 7, wherein said file system driver, in translating said file system access request, translates at least one of a logical drive and file system path name in said file system access request into a universal resource identifier.

26. The client data processing system of claim 25, said data storage further comprising:

a mapping table including at least one entry mapping between a universal resource identifier and at least one of a logical drive and file system path name, wherein said file system driver translates said file system access request by reference to said mapping table.

27. The computer program product of claim 13, wherein, responsive to said file system access request, said file system driver constructs a plurality of request frames, wherein at least two of said plurality of request frames are different types of frames specifying different file access methods.

28. The computer program product of claim 13, wherein said file system access request is a first file system access request, and wherein said file system driver, responsive to receipt of a second file system access request, refrains from constructing any request frame.

29. The computer program product of claim 13, wherein said file system driver, in translating said file system access request, translates at least one of a logical drive and file system path name in said file system access request into a universal resource identifier.

30. The computer program product of claim 29, said computer usable medium further comprising:

a mapping table including at least one entry mapping between a universal resource identifier and at least one of a logical drive and file system path name, wherein said file system driver translates said file system access request by reference to said mapping table.

* * * * *